(12) United States Patent
Stahle et al.

(10) Patent No.: US 10,030,678 B2
(45) Date of Patent: Jul. 24, 2018

(54) PRESSURE COMPENSATED LOAD SENSE HYDRAULIC SYSTEM EFFICIENCY IMPROVEMENT SYSTEM AND METHOD

(71) Applicant: DEERE & COMPANY, Moline, IL (US)

(72) Inventors: Scott Stahle, Dubuque, IA (US); Jonathan M. Takosky, Dubuque, IA (US); Christopher Matthews, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 231 days.

(21) Appl. No.: 15/184,192

(22) Filed: Jun. 16, 2016

(65) Prior Publication Data
US 2017/0363114 A1    Dec. 21, 2017

(51) Int. Cl.
| | | |
|---|---|---|
| *F15B 13/02* | (2006.01) | |
| *F15B 11/05* | (2006.01) | |
| *A01G 23/00* | (2006.01) | |

(52) U.S. Cl.
CPC ............ *F15B 11/05* (2013.01); *A01G 23/006* (2013.01); *F15B 13/026* (2013.01); *F15B 2211/50572* (2013.01)

(58) Field of Classification Search
CPC ................ F15B 11/05; F15B 13/026; F15B 2211/50572; A01G 23/006
See application file for complete search history.

(56) References Cited

U.S. PATENT DOCUMENTS

| | | | | |
|---|---|---|---|---|
| 3,960,284 A | * | 6/1976 | Carpenter ............. | E02F 9/2221 414/694 |
| 4,431,365 A | * | 2/1984 | Sturtz, Jr. ................ | B66C 3/16 294/201 |
| 5,083,428 A | * | 1/1992 | Kubomoto ............ | E02F 9/2239 60/421 |
| 5,134,853 A | | 8/1992 | Hirata et al. | |
| 5,540,050 A | | 7/1996 | Krupowicz | |

(Continued)

OTHER PUBLICATIONS

Womack Machine Supply Co., "A Load Sensing Control Increases Pump and Circuit Efficiency," before Sep. 2016, 3 pgs., http://www.womackmachine.com/engineering-toolbox/design-data-sheets/a-load-sensing-control-increases-pump-and-circuit-efficiency.aspx.

*Primary Examiner* — Thomas E Lazo
(74) *Attorney, Agent, or Firm* — Taft Stettinius & Hollister LLP; Stephen F. Rost

(57) ABSTRACT

A pressure compensated load sense hydraulic system and method is disclosed where a first pressure compensated valve controls flow between a pump and a first function based on a highest function load; and a second pressure compensated valve controls flow between the pump and a second function based on the highest function load. First and second operator controls activate the first and second functions, respectively. When the first function is stalled and the second function is activated, the controller closes the first valve to remove the first function load from the load sense circuit and prevent flow to or from the first function. The controller can determine the first function is stalled when a timer exceeds an initialization period. When the controller closes the first valve, it can cycle the first valve between a shutoff period where the valve is closed, and a refresh period where the valve is opened.

20 Claims, 4 Drawing Sheets

(56) References Cited

U.S. PATENT DOCUMENTS

| | | | |
|---|---|---|---|
| 7,614,843 B2 * | 11/2009 | Hested | B66C 1/585 |
| | | | 294/104 |
| 8,813,486 B2 * | 8/2014 | Peterson | F15B 21/087 |
| | | | 60/422 |
| 9,598,837 B2 * | 3/2017 | Fletcher | E02F 9/2029 |

* cited by examiner

PRESSURE COMPENSATED LOAD SENSE HYDRAULIC SYSTEM EFFICIENCY IMPROVEMENT SYSTEM AND METHOD

FIELD OF THE DISCLOSURE

The present disclosure relates to hydraulic systems, and more particularly to a system and method that improves the efficiency of pressure compensated load sense hydraulic systems.

BACKGROUND

Pressure compensated load sense hydraulic systems are used in many industries, including for example mobile construction and forestry equipment. Pressure compensated load sense systems allow for better multi-functioning performance due to improved flow sharing with pressure compensation. Without pressure compensation, the flow in a hydraulic system will go to the flow path of least resistance. For example, when commanding two functions (F1 and F2) in a hydraulic system with more flow than the flow source can provide, uneven flow sharing will occur when the two functions have differing loads. In a situation where the max pump flow is 10 GPM (gallons per minute) and a flow of 10 GPM is being commanded to each of the two functions F1 and F2, where F1's load requires 3000 psi (pounds per square inch) to move and F2's load only requires 1000 psi to move, then F2 will move first and F1 will not move until F2 stops being commanded or reaches a physical limit such as the end of stroke of a cylinder. Pressure compensators can be added to hydraulic systems to improve this situation.

If pressure compensation is added to the hydraulic system in the same example as above, each function F1 and F2 will get a portion of the max flow based on each function's percentage of the sum of the requested flow. This is accomplished through a pressure balance using a pressure compensator for each of the functions F1 and F2. The highest function load (3000 psi) is applied on one side of each pressure compensator trying to force that compensator closed, and the individual function's load (3000 psi for F1, and 1000 psi for F2) on the opposite side of the compensator trying to force the compensator open. The compensator of the lower loaded function F2 will be forced closed since the highest function load will be higher than the lower loaded function's load. This added restriction to the lower loaded function will make both flow paths to F1 and F2 have equal resistance allowing flow sharing between two unequally loaded functions. In this situation, F1 flow request is 10 GPM and the F2 flow request is 10 GPM for a total requested flow of 20 GPM. Since the F1 flow request is 50% of the sum of the requested flow, F1 will get 50% of the available pump flow which is 5 GPM. And since the F2 flow request is also 50% of the sum of the requested flow, F2 will get 50% of the available pump flow, 5 GPM, as well.

Although pressure compensation has the benefit of flow sharing, the pressure compensators introduce added restriction and loss in power that results in heat production. When multifunctioning, the larger the difference between the smallest and greatest load, the larger the amount of heat that is produced. The power lost to heat is represented by the following fluid power equation:

Power=$P*Q/1714$ where:
P=the pressure drop across the compensator in PSI,
Q=the flow rate through the compensator in GPM, and
Power=the power loss in horsepower (HP).

It would be desirable to reduce the pressure difference between functions requesting flow in a pressure compensated hydraulic circuit to reduce the power loss and heat production of the pressure compensation.

SUMMARY

A pressure compensated load sense hydraulic system for a machine is disclosed, where the pressure compensated load sense hydraulic system includes first and second hydraulic functions, a hydraulic pump that provides flow to the first and second hydraulic functions, first and second pressure compensated hydraulic valves, first and second operator controls, and a controller. The first pressure compensated hydraulic valve controls flow between the hydraulic pump and the first hydraulic function and restricts flow based on a highest function load. The first hydraulic function has a first function load, the second hydraulic function has a second function load, and the highest function load is the greater of the first and second function loads. The second pressure compensated hydraulic valve controls flow between the hydraulic pump and the second hydraulic function and restricts flow based on the highest function load. The first operator control generates first control signals to activate the first hydraulic function, and the second operator control generates second control signals to activate the second hydraulic function. The controller receives the first and second control signals. While the first control signals indicate the first hydraulic function is stalled, the controller closes the first hydraulic valve to prevent flow to or from the first hydraulic function and block the first function load from the pump when the second hydraulic function is activated, and the controller reopens the first hydraulic valve to allow flow to or from the first hydraulic function and unblock the first function load from the pump when the second hydraulic function is deactivated.

The pressure compensated load sense hydraulic system can also include an initialization timer that tracks time since the first hydraulic function was activated each time the first operator control begins to generate the first control signals to activate the first hydraulic function; and the controller can determine the first control signals indicate the first hydraulic function is stalled when the initialization timer exceeds an initialization period. The initialization period can be, for example, 10 seconds.

When the controller closes the first hydraulic valve while the first control signals indicate the first hydraulic function is stalled and the second hydraulic function is activated, the controller can cycle the first hydraulic valve between a shutoff period during which the first hydraulic valve is closed to prevent flow to or from the first hydraulic function; and a refresh period during which the first hydraulic valve is opened to allow flow to or from the first hydraulic function. The shutoff period can be, for example, 5 seconds, and the refresh period can be, for example, 1 second.

The machine can be, for example, a skidder where the first hydraulic function can be a hydraulic grapple, and the second hydraulic function can be a hydraulic boom or a hydraulic arch.

The pressure compensated load sense hydraulic system can also include a load sense circuit that hydraulically couples a load sense relief valve, a hydraulic control of the hydraulic pump, a control port of the first pressure compensated hydraulic valve, and a control port of the second pressure compensated hydraulic valve. The load sense circuit can sense the highest function load of hydraulic functions receiving flow from the hydraulic pump. The first pressure compensated hydraulic valve can include a first spool valve that controls flow between the hydraulic pump and the first hydraulic function, and a first pressure compensator that restricts flow between the hydraulic pump and the first hydraulic function based on the highest function load. The second pressure compensated hydraulic valve can include a second spool valve that controls flow between the hydraulic pump and the second hydraulic function, and a second pressure compensator that restricts flow between the hydraulic pump and the second hydraulic function based on the highest function load. The first pressure compensator can restrict flow between the hydraulic pump and the first hydraulic function based on a pressure balance between the highest function load sensed by the load sense circuit and the first function load. The second pressure compensator can restrict flow between the hydraulic pump and the second hydraulic function based on a pressure balance between the highest function load sensed by the load sense circuit and the second function load.

A pressure compensated load sense hydraulic method is disclosed for a machine that includes first and second hydraulic functions, and a hydraulic pump that provides flow to the first and second hydraulic functions. The method includes controlling flow between the hydraulic pump and the first hydraulic function using a first pressure compensated hydraulic valve based on a highest function load; controlling flow between the hydraulic pump and the second hydraulic function using a second pressure compensated hydraulic valve based on the highest function load; monitoring first control signals that activate the first hydraulic function; monitoring second control signals that activate the second hydraulic function; determining when the first hydraulic function is stalled; and while the first hydraulic function is stalled, closing the first hydraulic valve to prevent flow to or from the first hydraulic function and block the first function load from the pump when the second hydraulic function is activated, and reopening the first hydraulic valve to allow flow to or from the first hydraulic function and unblock the first function load from the pump when the second hydraulic function is deactivated. The first hydraulic function has a first function load, the second hydraulic function has a second function load, and the highest function load is the greater of the first and second function loads.

Determining when the first hydraulic function is stalled can include resetting an initialization timer each time the first control signals start or stop activating the first hydraulic function; running the initialization timer while the first control signals continue activating the first hydraulic function; and determining the first hydraulic function is stalled when the initialization timer exceeds an initialization period. The initialization period can be, for example, 10 seconds. Closing the first hydraulic valve while the first hydraulic function is stalled and the second hydraulic function is activated can include closing the first hydraulic valve for a shutoff period to prevent flow to or from the first hydraulic function; opening the first hydraulic valve for a refresh period to allow flow to or from the first hydraulic function; and repeating the closing the first hydraulic valve for a shutoff period and opening the first hydraulic valve for a refresh period steps while the first hydraulic function is stalled and the second hydraulic function is activated. The shutoff period can be, for example, 5 seconds, and the refresh period can be, for example, 1 second.

The machine can be, for example, a skidder where the first hydraulic function is a hydraulic grapple, and the second hydraulic function is a hydraulic boom or a hydraulic arch.

The pressure compensated load sense hydraulic method can also include sensing the highest function load of hydraulic functions receiving flow from the hydraulic pump using a load sense circuit that hydraulically couples a load sense relief valve, a hydraulic control of the hydraulic pump, a control port of the first pressure compensated hydraulic valve, and a control port of the second pressure compensated hydraulic valve. The first pressure compensated hydraulic valve can include a first spool valve and a first pressure compensator, and the second pressure compensated hydraulic valve can include a second spool valve and a second pressure compensator. Controlling flow between the hydraulic pump and the first hydraulic function can include controlling flow between the hydraulic pump and the first hydraulic function using the first spool valve, and restricting flow between the hydraulic pump and the first hydraulic function based on the highest function load using the first pressure compensator. Controlling flow between the hydraulic pump and the second hydraulic function can include controlling flow between the hydraulic pump and the second hydraulic function using the second spool valve, and restricting flow between the hydraulic pump and the second hydraulic function based on the highest function load using the second pressure compensator. Restricting flow between the hydraulic pump and the first hydraulic function can include pressure balancing by the first pressure compensator between the highest function load sensed by the load sense circuit and the first function load. Restricting flow between the hydraulic pump and the second hydraulic function can include pressure balancing by the second pressure compensator between the highest function load sensed by the load sense circuit and the second function load.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
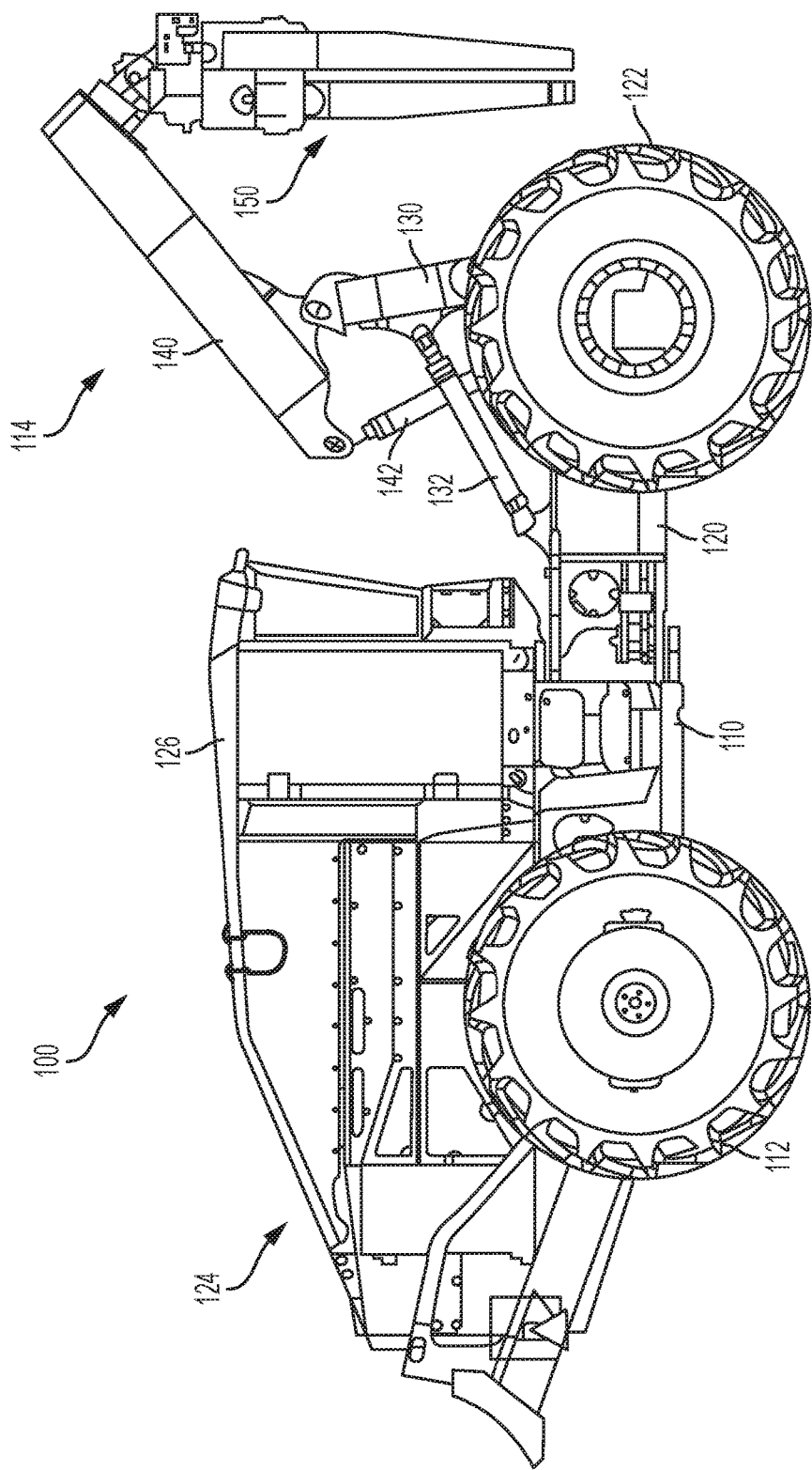
FIG. 1 illustrates an exemplary machine having a pressure compensated load sense hydraulic system.

FIG. 1 illustrates an example of a work machine, a skidder 100, having a pressure compensated load sense hydraulic system. The present disclosure is not limited, however, to skidders but also is intended to include other work machines used in construction, forestry, agriculture and other industries having a pressure compensated load sense hydraulic system. As such, while the figures and forthcoming description may relate to a wheeled skidder, it is to be understood that the scope of the present disclosure extends beyond a wheeled skidder, and the term "machine" or "work machine" will also be used. The term "machine" or "work machine" is intended to be broader and encompass other vehicles besides a skidder.

The machine 100 includes a front vehicle frame 110 coupled to a rear vehicle frame 120. Front wheels 112 support the front vehicle frame 110, and the front vehicle frame 110 supports an engine compartment 124 and an operator cab 126. Rear wheels 122 support the rear vehicle frame 120, and the rear vehicle frame 120 supports a boom assembly 114. The engine compartment 124 houses a vehicle engine or motor, such as a diesel engine which provides the motive power for driving the front and rear wheels 112, 122, and for operating the other components associated with the machine 100. The operator cab 126, where an operator sits when operating the machine 100, includes a plurality of controls (e.g., joysticks, pedals, buttons, etc.) for controlling the machine 100 during operation thereof.

As shown in FIG. 1, the boom assembly 114 includes an arch section 130, a boom section 140 and a grapple 150. A proximal end of the arch section 130 is pivotably coupled to the rear vehicle frame 120 and a distal end of the arch section 130 is pivotably coupled to the boom section 140. One or more arch hydraulic cylinders 132 are controllable by the operator to move the arch 130. A proximal end of the boom section 140 is pivotably coupled to the arch section 130 and a distal end of the boom section 140 is pivotably coupled to the grapple 150. One or more boom hydraulic cylinders 142 are coupled to the proximal end of the boom section 140 and are controllable by the operator to move the boom 140. A proximal end of the grapple 150 is coupled to the distal end of the boom section 140.

Figure 2:
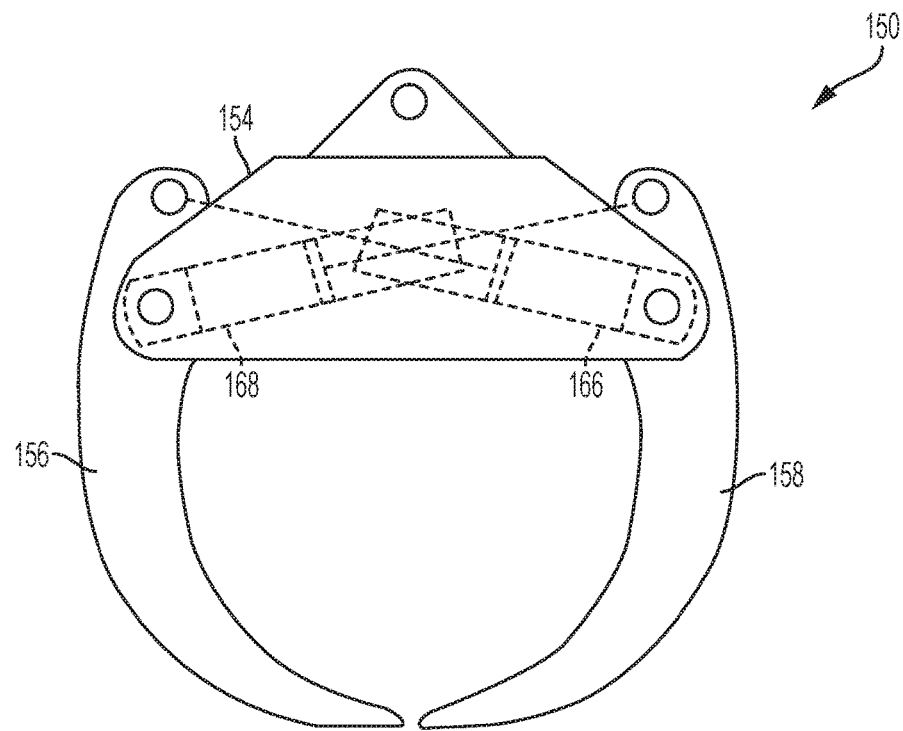
FIG. 2 illustrates an exemplary embodiment of a grapple.

An exemplary embodiment of a grapple 150 is shown in FIG. 2. The grapple 150 includes a base 154, left and right tongs 156, 158, and left and right hydraulic cylinders 166, 168. The base 154 is coupled to the distal end of the boom section 140. The proximal ends of the left and right tongs 156, 158 are coupled to the base 154, and the distal ends of the left and right tongs 156, 158 are controllable by the left and right hydraulic cylinders 166, 168 to open and close the grapple 150. The left hydraulic cylinder 166 has a head end coupled to the base 154, and a piston end coupled to the proximal end of the left tong 156. The right hydraulic cylinder 168 has a head end coupled to the base 154, and a piston end coupled to the proximal end of the right tong 158. The operator can control extension and retraction of the left and right hydraulic cylinders 166, 168 to open and close the grapple 150. When the left and right hydraulic cylinders 166, 168 are retracted, the proximal ends of the left and right tongs 156, 158 are brought closer together, which pulls apart the distal ends of the left and right tongs 156, 158, which opens the grapple 150. When the left and right hydraulic cylinders 166, 168 are extended, the proximal ends of the left and right tongs 156, 158 are pushed apart, which brings together the distal ends of the left and right tongs 156, 158, which closes the grapple 150. Thus in this embodiment, the operator can retract the left and right tong cylinders 166, 168 to open the grapple 150 to surround a payload (e.g. trees or other woody vegetation), and then extend the left and right tong cylinders 166, 168 to close the grapple 150 to grab, hold and lift the payload so the machine 100 can move it to another desired location.

Figure 3:
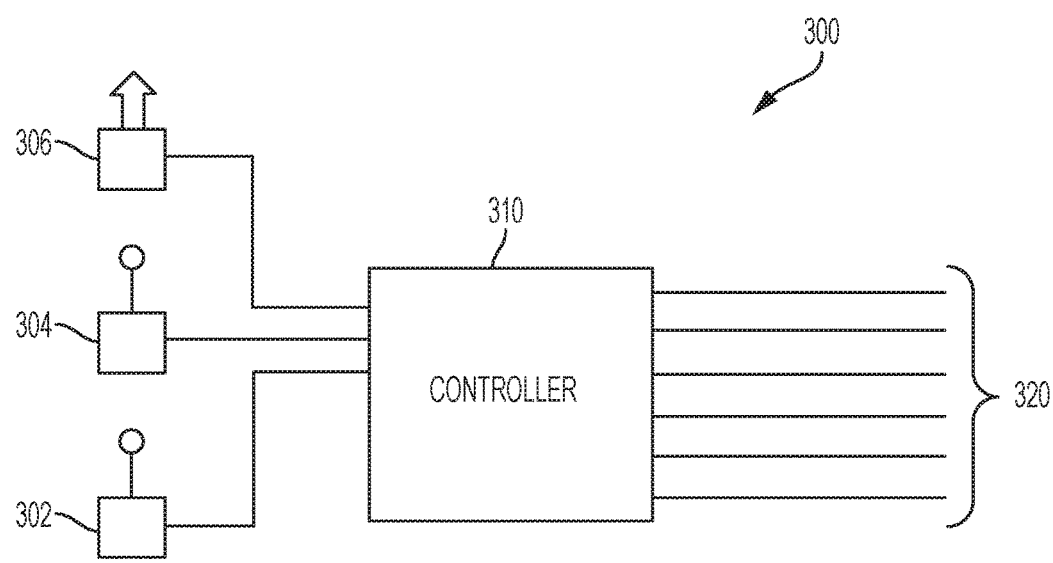
FIG. 3 illustrates some exemplary operator controls for a machine having a pressure compensated load sense hydraulic system.

FIG. 3 illustrates an example of operator controls 300 for the arch, boom and tong hydraulic cylinders 132, 142, 166, 168. The operator controls 300 include a boom control 302, an arch control 304 and a grapple control 306. The boom control 302 controls extension and retraction of the boom hydraulic cylinders 142 to move the boom 140. The arch control 304 controls extension and retraction of the arch hydraulic cylinders 132 to lower and raise the arch 130. The grapple control 306 controls extension and retraction of the tong hydraulic cylinders 166, 168 to open and close the grapple 150. The boom, arch and grapple controls 302, 304, 306 send electrical signals to an electrical controller 310 and the controller 310 sends command signals to control the boom, arch and tong hydraulic cylinders 142, 132, 166, 168 over control lines 320.

Figure 4:
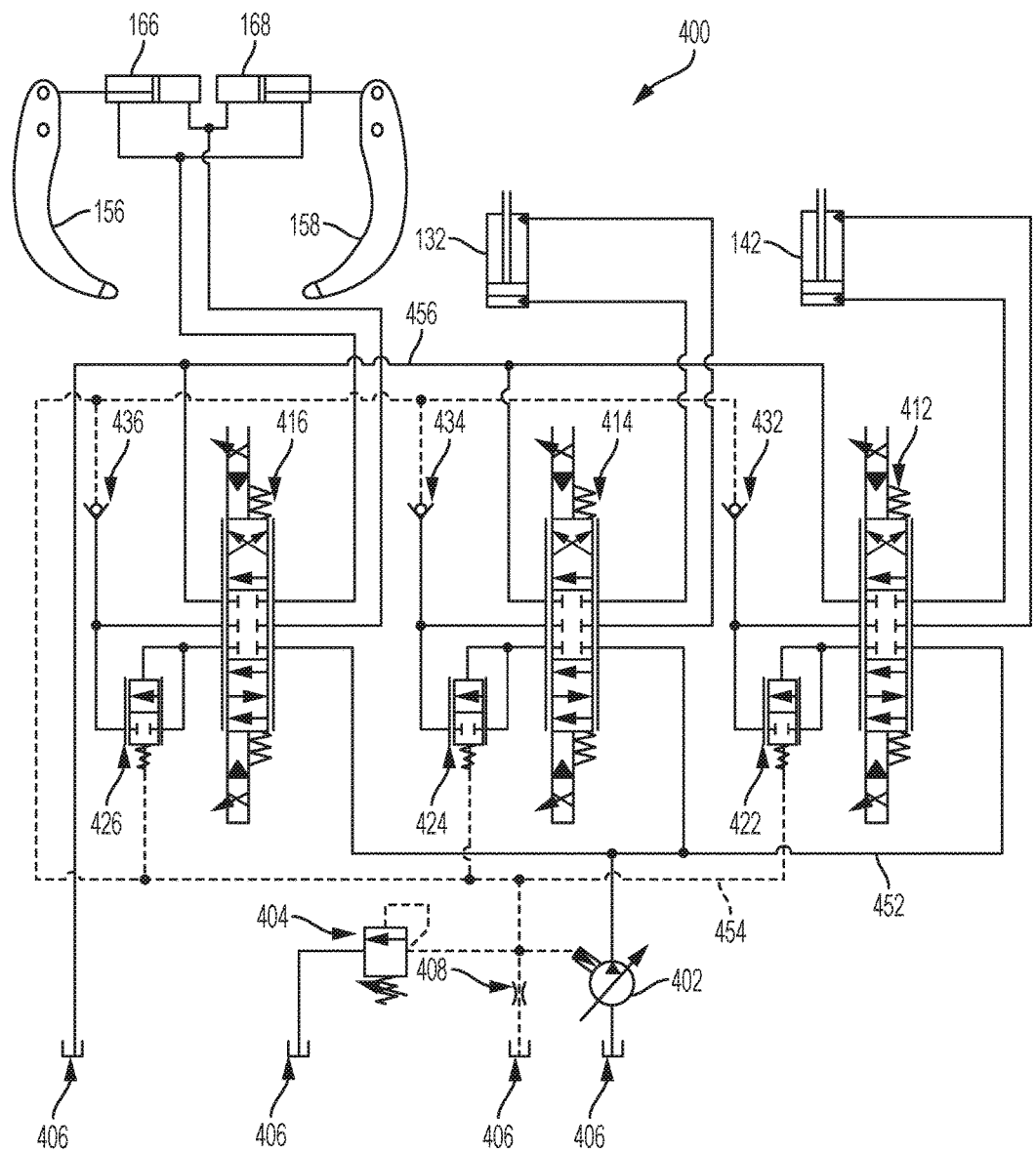
FIG. 4 is an exemplary schematic for a pressure compensated load sense hydraulic system.

FIG. 4 is a schematic of an exemplary pressure compensated load sense hydraulic system 400 for the arch, boom and tong hydraulic cylinders 132, 142, 166, 168. The hydraulic system 400 includes a hydraulic pump 402, a load sense relief valve 404, a fluid reservoir 406, a load sense drain orifice 408, a boom spool valve 412, an arch spool valve 414, a grapple spool valve 416, a boom pressure compensator 422, an arch pressure compensator 424, a grapple pressure compensator 426, a boom load check valve 432, an arch load check valve 434, and a grapple load check valve 436. The command signals sent by the controller 310 control the positions of the boom, arch and grapple spool valves 412, 414, 416. The pump 402 hydraulically powers the arch 130, boom 140 and grapple 150.

The boom, arch and grapple spool valves 412, 414, 416 are shown as electrically controlled, closed center, proportional control valves. Electrically controlled solenoids can be used to shift the spool valves 412, 414, 416, where the solenoids are proportional and therefore can be varied to change the stroke of the spool valves 412, 414, 416. The more electrical current commanded to one of the solenoids, the more each respective spool valve 412, 414, 416 will stroke. The boom, arch and grapple pressure compensators 422, 424, 426 are shown as proportional and therefore can vary the flow. The boom, arch and grapple pressure compensators 422, 424, 426 are shown downstream of the boom, arch and grapple spool valves 412, 414, 416 to represent a post-compensated hydraulic load sense system. The improvement to the pressure compensated load sense hydraulic system can be used in both post-compensated and pre-compensated load sense systems. When one of the solenoids is electrically commanded on, and the associated spool valve 412, 414, 416 shifts to allow flow from the pump 402 to its respective hydraulic function cylinder, the passage through the spool valve 412, 414, 416 from the pump inlet side to the associated pressure compensator 422, 424, 426 is effectively a variable metering orifice. The variable metering orifice is commonly referred to as the inlet metering orifice. As the spool valve 412, 414, 416 strokes more, the open area of this inlet metering orifice becomes larger. The larger the open area of the metering orifice, the larger the flow rate through the spool valve 412, 414, 416 at a given pressure drop.

A pump outlet line 452 hydraulically couples the pump 402 to the boom, arch and grapple spool valves 412, 414, 416. A reservoir line 456 hydraulically couples the boom, arch and grapple spool valves 412, 414, 416 to the reservoir 406. The boom spool valve 412 controls flow between the pump 402 and the boom hydraulic cylinder 142, and between the boom hydraulic cylinder 142 and the reservoir 406 to control raising and lowering of the boom 140. The arch spool valve 414 controls flow between the pump 402 and the arch hydraulic cylinder 132, and between the arch hydraulic cylinder 132 and the reservoir 406 to control raising and lowering of the arch 130. The grapple spool valve 416 controls flow between the pump 402 and the grapple hydraulic cylinders 166, 168, and between the grapple hydraulic cylinders 166, 168 and the reservoir 406 to control opening and closing of the grapple 150.

A load sense circuit 454 hydraulically couples a hydraulic control of the pump 402, the load sense relief valve 404, the load sense drain orifice 408, the lower control ports of the boom, arch and grapple pressure compensators 422, 424, 426, and the block flow sides of the boom, arch and grapple load check valves 432, 434, 436. The load sense circuit 454 indicates the highest function load of the arch, boom and tong hydraulic cylinders 132, 142, 166, 168 that are currently receiving flow from the pump 402 through their associated spool valve 412, 414, 416.

In a scenario when the operator is sending commands using the boom, arch and grapple controls 302, 304, 306 to raise the arch and boom 130, 140, and close the grapple 150, the controller 310 can send command signals to the solenoids of the boom, arch and grapple spool valves 412, 414, 416 to shift the spool valves 412, 414, 416 to the bottom positions. In the bottom position, the boom spool valve 412 controls variable flow from the hydraulic pump 402 through the lower flow path to the boom pressure compensator 422; and the boom pressure compensator 422 controls variable flow through the middle flow path of the boom spool valve 412 to retract the boom hydraulic cylinder 142. In the bottom position, the arch spool valve 414 controls variable flow from the hydraulic pump 402 through the lower flow path to the arch pressure compensator 424; and the arch pressure compensator 424 controls variable flow through the middle flow path of the arch spool valve 414 to retract the arch hydraulic cylinder 132. In the bottom position, the grapple spool valve 416 controls variable flow from the hydraulic pump 402 through the lower flow path to the grapple pressure compensator 426, and the grapple pressure compensator 426 controls variable flow through the middle flow path of the grapple spool valve 416 to extend the tong hydraulic cylinders 166, 168. The load sensed in moving the boom, arch and tong hydraulic cylinders 142, 132, 166, 168 is communicated back through the middle flow paths of the boom, arch and grapple spool valves 412, 414, 416 to the allow flow sides of the boom, arch and grapple load check valves 432, 434, 436, respectively. The load sense circuit 454 senses the highest load pressure through the boom, arch and grapple load check valves 432, 434, 436. Those of skill in the art will realize that if one or more of the hydraulic functions (boom, arch or grapple 140, 130, 150) is inactive (no flow being commanded), then the respective spool valve 412, 414, 416 will be in the closed position and the load sense circuit 454 will not sense the load pressure from the inactive hydraulic function regardless of its pressure relative to the other active hydraulic functions.

In this scenario, a pressure balance is performed by the pressure compensators 422, 424, 426 for each of the active hydraulic functions. The load sense circuit 454 applies the highest function load on the bottom side of each of the boom, arch and grapple pressure compensators 422, 424, 426 trying to force the respective compensator closed, and the individual function's load is applied on the top side of each of the boom, arch and grapple pressure compensators 422, 424, 426 trying to force the respective compensator open. The compensators of the lower loaded function(s) will be forced closed since the highest function load will be higher than the load of the respective function. This added restriction to the lower loaded function(s) will make all of the flow paths to the active hydraulic functions have equal resistance allowing flow sharing between unequally loaded functions. As explained above, although pressure compensation has the benefit of flow sharing, the pressure compensators introduce added restriction and loss in power that results in heat production.

On some machines (e.g. the skidder 100) with a pressure compensated load sense system, the situation of having a large difference between the heaviest and lightest load can occur frequently when commanding the grapple 150 closed with constant tong squeeze to hold and move a payload. Constant tong squeeze is when the tong close function is constantly being activated to provide constant pressure through the tong hydraulic cylinders 166, 168 on the tongs 156, 158 in the closing direction. This constant pressure closing the tongs 156, 158 is necessary to keep a hold of a payload in the grapple 150 when skidding. Without this constant force on the tongs 156, 158 to hold the payload, the payload may fall out of the grapple 150. When constant tong squeeze is active, the tong hydraulic cylinders 166, 168 are stalled out against the payload which causes the pressure in the load sense circuit 454 to increase until the load sense relief setting of the load sense relief valve 404 is reached. This brings the hydraulic pump 402 to maximum system pressure. Therefore when another function is cycled, e.g. the arch 130 or boom 140, a large pressure difference can exist between the highest load sense produced by the grapple 150 and the load of the arch 130 or boom 140. This is particularly the case when the arch 130 or boom 140 is being lowered. Lowering the arch 130 or boom 140 is a gravity-aided function and therefore does not take much pressure to move. The arch 130 or boom 140 are also functions that usually require a large amount of flow to obtain adequate cycle times. The result of this large pressure difference and the flow rate results in a significant power loss generating heat.

Since the boom 140, arch 130, and grapple 150 hydraulic functions are electro-hydraulically controlled using the controls 302, 304, 306, the controller 310 knows when each of the boom, arch and tong controls 302, 304, 306 are being used to activate the boom, arch and tong hydraulic functions 140, 130, 150. Thus, when the tong control 306 is being used to constantly squeeze or close the tongs 156, 158 of the grapple 150, and the boom or arch controls 302, 304 are activated to lower the boom or arch 140, 130, the controller 310 can suspend the tong close command. When the tong close command is suspended, the grapple spool valve 416 is released to the neutral state (middle position) blocking flow between the hydraulic pump 402 and the tong hydraulic cylinders 166, 168, and trapping hydraulic fluid between the tong spool valve 416 and the tong hydraulic cylinders 166, 168. Blocking flow between the hydraulic pump 402 and the tong hydraulic cylinders 166, 168 also blocks the load of the tong hydraulic cylinders 166, 168 from the load sense circuit 454. Since the hydraulic fluid is trapped between the tong spool valve 416 and tong hydraulic cylinders 166, 168, the only way to lose squeeze force on the logs is from hydraulic system leakage or if the tongs 156, 158 are forced open by some external force causing a tong work port relief to open on the tong hydraulic cylinders 166, 168. An external force causing the cylinder pressure to reach the work port relief setting on the tong hydraulic cylinders 166, 168 is possible with or without the improvement to the pressure compensated load sense hydraulic system. To address hydraulic system leakage, since it typically only takes a few seconds to lower the arch 130 or boom 140, this is usually not enough time for the cylinder pressure of the tong hydraulic cylinders 166, 168 to leak down. To help ensure leakage does not cause the grapple 150 to lose hold of the payload, a suspend timer can be implemented to only allow the tong close command to be suspended a certain suspend time period, e.g. 5 seconds. After the suspend time period, the tong close command can be reactivated for a reactivation time period, e.g. 1 second. As long as the tong close command is still active and the arch 130 or boom 140 lower command is still active, this suspend and reactivate process can be repeated by the controller 310 to suspend the tong close command for the suspend time period and reactivate the tong close command for the reactivation time period.

A grapple close or tong squeeze initialization time period can also be implemented to help ensure that the grapple 150 is securely closed on the payload held by the tongs 156, 158 before suspending the tong squeeze command. The tong squeeze initialization time period can be set to any desired time, e.g. 10 seconds. The controller 310 can be configured to not suspend a tong squeeze command during the initial tong squeeze initialization time period that the tong squeeze command is active so that the tongs have an opportunity to fully close and grab against the payload. Otherwise, without a proper clamp force on the payload, the payload may slip out of the grapple 150 when the machine starts to travel. So if an arch 130 or boom 140 lower is commanded during the initial tong squeeze initialization time period of a tong squeeze command, the controller 310 will not suspend the tong squeeze command. After the tong squeeze initialization time period has passed, then it is assumed that the tongs 156, 158 have had a chance to fully close against the payload and the tong squeeze command can be suspended when an arch 130 or boom 140 lower command is given by the operator.

The following example helps illustrate the potential power savings of the improvement to the pressure compensated load sense hydraulic system illustrated in FIG. 4. Assume that the load sense relief valve 404 has a load sense relief setting of 2700 psi (pounds per square inch) which means that the load sense circuit 454 will be limited to 2700 psi. Assume also that the load sense margin of the pump 402 is set to 300 psi. The outlet pressure produced by the pump 402 will equal the load sense pressure plus the pump load sense margin. Therefore in this example, the maximum system pressure will be 3000 psi. Also assume that the bias springs for the pressure compensators 422, 424, 426 are negligible in force and that plumbing losses are negligible as well. Lastly, assume that the pressure required to lower the arch 130 is 500 psi, the flow requirement to lower the arch 130 is 50 GPM (gallons per minute), and the pump 402 is adequately sized to provide a flow of 50 GPM.

The above assumptions will be used for the load sensing hydraulic system 400 without the improvement in the situation where the operator is commanding a constant tong squeeze for the grapple 150, and the operator is commanding a lowering of the arch 130. With constant tong squeeze for the grapple 150 active, the controller 310 will send control signals to the solenoid of the grapple spool valve 416, shifting the grapple spool valve 416 open to allow the pump 402 to flow hydraulic fluid to the head end of the tong cylinders 166, 168, closing the tongs 156, 158 around a payload, e.g. logs or other material. Once the tongs 156, 158 are fully closed against the payload, the tong cylinders 166, 168 will be stalled which will cause the load sense circuit 454 to reach the load sense relief limit of 2700 psi. The outlet pressure of the pump 402 will be equal to the highest load sense signal (2700 psi from the tong cylinders 166, 168) plus the load sense margin (300 psi) which is 3000 psi. The load sense pressure on the bottom side of the arch compensator 424 will be the highest load sense pressure of 2700 psi. This load sense pressure of 2700 psi will force the arch compensator 424 to the closed position. When the operator activates lowering of the arch 130 using the arch control 304 to a full (100%) lowering command, the controller 310 will send control signals to the solenoid of the arch spool valve 414, shifting the arch spool valve 414 to full stroke. With the arch spool valve 414 shifted, the outlet pressure (3000 psi) of the pump 402 will initially be seen at the top side of the arch compensator 424. With pump outlet pressure (3000 psi) on the top side and load sense pressure (2700 psi) on the bottom side of the arch compensator 424, the arch compensator 424 will open allowing flow to the arch cylinder 132. Once the arch compensator 424 is open, the pressure upstream of the arch compensator 424 will initially want to drop to the pressure it takes to lower the arch 130 which is 500 psi. But once the pressure upstream of the arch compensator 424 is lowered to the highest load sense pressure of 2700 psi, the arch compensator 424 will start to close. The arch compensator 424 will then restrict flow to the arch cylinder 132 such that the pressure upstream of the arch compensator 424 will be equal to the highest load sense pressure creating a pressure balance on each side of the arch compensator 424. This means that the pressure upstream of the arch compensator 424 will be equal to 2700 psi resulting in a 300 psi drop across the inlet metering orifice in the arch spool valve 414 (3000 psi−2700 psi=300 psi). The inlet metering orifice in the arch spool valve 414 can be designed such that there will be 300 psi drop at 50 GPM at full stroke. The arch compensator 424 will then have the highest load sense pressure of 2700 psi upstream and the arch lower load of 500 psi downstream which results in a 2200 psi pressure drop across the arch compensator 424 at 50 GPM. Using the above fluid power equation, Power=P*Q/1714, calculates a power loss of approximately 64 HP going straight to heat in this particular example.

The same assumptions and situation will now be used for the load sensing hydraulic system 400 with the improvement, which will suspend the constant tong squeeze command when the arch 130 or boom 140 is being lowered. With constant tong squeeze for the grapple 150 active, the controller 310 sends control signals to the solenoid of the grapple spool valve 416, shifting the grapple spool valve 416 open to continuously supply flow of hydraulic fluid towards the head end of the tong cylinders 166, 168, closing the tongs 156, 158 around a payload. After a tong squeeze initialization time period (e.g. 10 seconds) to ensure that the tongs 156, 158 are fully closed around the payload, the controller 310 determines the tong cylinders 166, 168 are stalled and suspends the tong squeeze command when lowering of the arch 130 or boom 140 is active. When lowering of the arch 130 is commanded using the arch control 304, the controller 310 will send control signals to the solenoid of the arch spool valve 414, shifting the arch spool valve 414 to lower the arch 140. When the controller 310 sends the control signals to the solenoid of the arch spool valve 414, the controller 310 will stop sending the control signals to the solenoid of the grapple spool valve 416 which allows the grapple spool valve 416 to return to its neutral position blocking flow between the hydraulic pump 402 and the tong cylinders 166, 168 through the grapple spool valve 416, which also blocks the load of the tong cylinders 166, 168 from the load sense circuit 454. With the grapple spool valve 416 closed, the maximum load sense signal will be the 500 psi load coming from the arch cylinder 132. Thus, the pressure upstream of the arch compensator 424 will equal the highest load sense signal. So the pressures upstream and downstream of the arch compensator 424 will both be 500 psi, and therefore there will essentially be no pressure drop or heat production across the arch compensator 424. So in this example, 64 HP of heat generation will be saved. When the operator stops commanding lowering of the arch 130, the controller 310 will no longer see the arch lowering command from the arch control 304 and will restart sending control signals to the solenoid of the grapple spool valve 416 to shift the grapple spool valve 416 open to direct flow of hydraulic fluid towards the head end of the tong cylinders 166, 168. This opens pump flow to the tong cylinders 166, 168, and also opens load pressure from the tong cylinders 166, 168 into the load sense circuit 454, allowing the outlet pressure of the pump 402 to reach the highest load sense signal plus pump margin and a constant squeeze will again be applied on the payload in the grapple 150.

Figure 5:
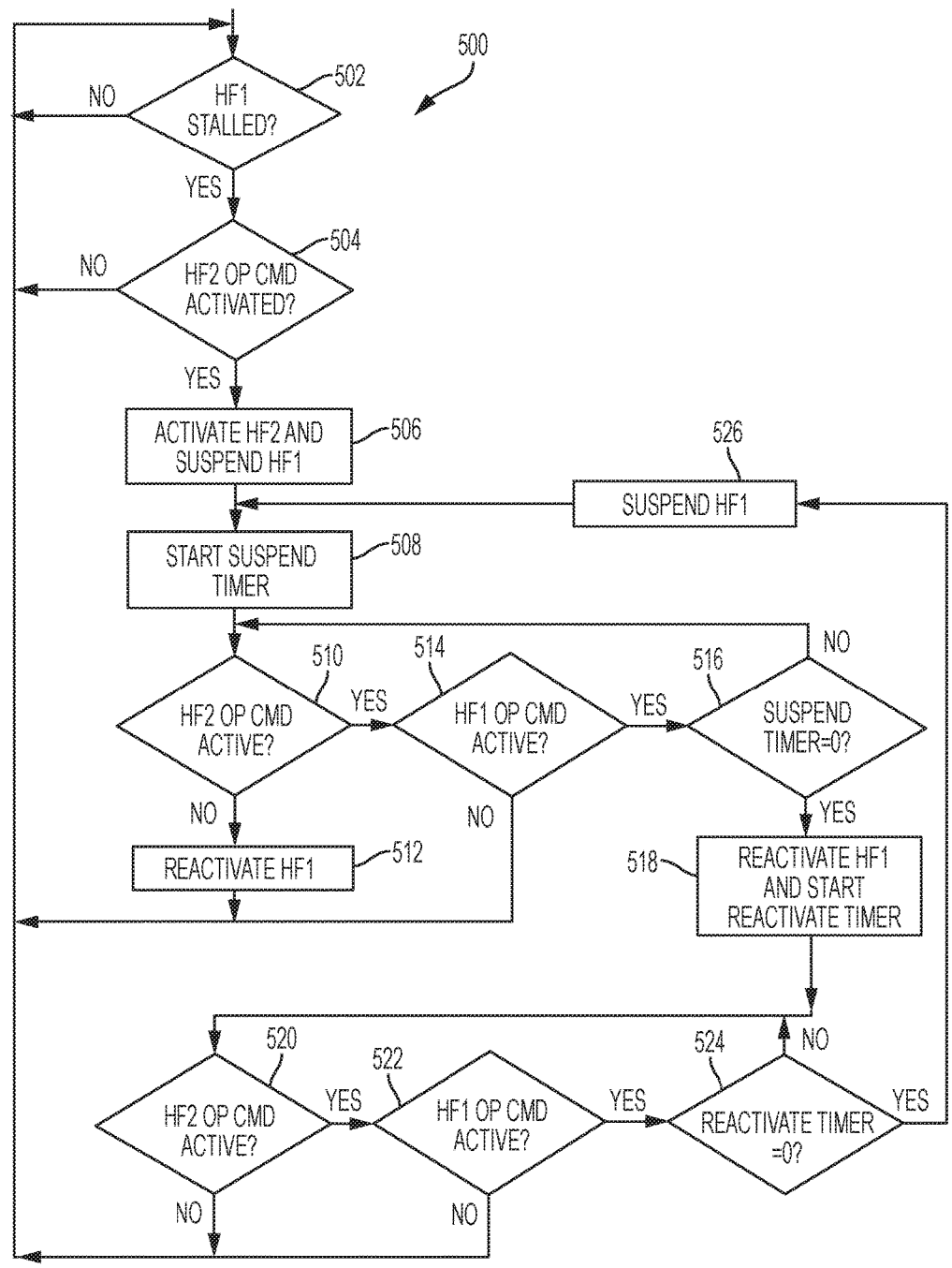
FIG. 5 is an exemplary control flow for an improved pressure compensated load sense hydraulic system.

FIG. 5 shows an example of a more general control flow 500 for an improved pressure compensated load sense hydraulic system with at least two hydraulic functions. At block 502 the system determines whether a first hydraulic function (HF1) is stalled. This can be done by waiting a predetermined initialization time period or by other methods. The system waits at block 502 until it determines that a first hydraulic function (HF1) is stalled. When the system determines that HF1 is stalled, control proceeds to block 504.

At block 504 the system checks if an operator command is being issued by an operator control to activate another hydraulic function (HF2). If no operator commands are being issued to activate another hydraulic function, control goes back to block 502. If operator commands are being issued to activate another hydraulic function (HF2), control proceeds to block 506.

At block 506, the system sends command signals to activate HF2 and to suspend HF1, which blocks flow to and from HF1 and also removes the load of HF1 from the pump. At block 508 the system starts a suspend timer to track a suspend time period for HF1. Control then proceeds to block 510.

At block 510 the system checks if operator commands are still being issued by an operator control for HF2. If operator commands are no longer being issued to activate HF2, the system reactivates HF1 at block 512, and control returns to block 502. If operator commands are still being issued to activate HF2, control proceeds to block 514.

At block 514 the system checks if operator commands are still being issued by an operator control for HF1. If operator commands are no longer being issued to activate HF1, control returns to block 502. If operator commands are still being issued to activate HF1, control proceeds to block 516.

At block 516 the system checks if the suspend time period for HF1 has passed. If the suspend time period for HF1 has passed, the system reactivates HF1 and starts a reactivation timer at block 518 to track a reactivation time period for HF1, and then control proceeds to block 520. If the suspend time period for HF1 has not passed, control returns to block 510.

At block 520 the system checks if operator commands are still being issued by an operator control for HF2. If operator commands are no longer being issued to activate HF2, the control returns to block 502. If operator commands are still being issued to activate HF2, control proceeds to block 522.

At block 522 the system checks if operator commands are still being issued by an operator control for HF1. If operator commands are no longer being issued to activate HF1, control returns to block 502. If operator commands are still being issued to activate HF1, control proceeds to block 524.

At block 524 the system checks if the reactivation time period for HF1 has passed. If the reactivation time period for HF1 has passed, control passes to block 526 where the system suspends HF1, and then returns to block 508 to restart the suspend timer. If the reactivation time period for HF1 has not passed, control returns to block 520.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A pressure compensated load sense hydraulic system for a machine, the pressure compensated load sense hydraulic system comprising:
   a first hydraulic function;
   a second hydraulic function;
   a hydraulic pump configured to provide flow to the first and second hydraulic functions;
   a first pressure compensated hydraulic valve configured to control flow between the hydraulic pump and the first hydraulic function and restrict flow based on a highest function load where the first hydraulic function has a first function load and the second hydraulic function has a second function load, the highest function load being the greater of the first and second function loads;
   a second pressure compensated hydraulic valve configured to control flow between the hydraulic pump and the second hydraulic function and restrict flow based on the highest function load;
   a first operator control configured to generate first control signals to activate the first hydraulic function;
   a second operator control configured to generate second control signals to activate the second hydraulic function;
   a controller that receives the first and second control signals;
   wherein while the first control signals indicate the first hydraulic function is stalled, the controller closes the first hydraulic valve to prevent flow to or from the first hydraulic function and block the first function load from the pump when the second hydraulic function is activated, and the controller reopens the first hydraulic valve to allow flow to or from the first hydraulic function and unblock the first function load from the pump when the second hydraulic function is deactivated.

2. The pressure compensated load sense hydraulic system of claim 1, further comprising:
   an initialization timer configured to track time since the first hydraulic function was activated each time the first operator control begins to generate the first control signals to activate the first hydraulic function; and wherein the controller determines the first control signals indicate the first hydraulic function is stalled when the initialization timer exceeds an initialization period.

3. The pressure compensated load sense hydraulic system of claim 2, wherein the initialization period is 10 seconds.

4. The pressure compensated load sense hydraulic system of claim 2, wherein when the controller closes the first hydraulic valve while the first control signals indicate the first hydraulic function is stalled and the second hydraulic function is activated, the controller is configured to cycle the first hydraulic valve between a shutoff period during which the first hydraulic valve is closed to prevent flow to or from the first hydraulic function; and a refresh period during which the first hydraulic valve is opened to allow flow to or from the first hydraulic function.

5. The pressure compensated load sense hydraulic system of claim 4, wherein the machine is a skidder, the first hydraulic function is a hydraulic grapple, and the second hydraulic function is a hydraulic boom or a hydraulic arch.

6. The pressure compensated load sense hydraulic system of claim 1, wherein when the controller closes the first hydraulic valve while the first control signals indicate the first hydraulic function is stalled and the second hydraulic function is activated, the controller is configured to cycle the first hydraulic valve between a shutoff period during which the first hydraulic valve is closed to prevent flow to or from the first hydraulic function; and a refresh period during which the first hydraulic valve is opened to allow flow to or from the first hydraulic function.

7. The pressure compensated load sense hydraulic system of claim 6, wherein the shutoff period is 5 seconds, and the refresh period is 1 second.

8. The pressure compensated load sense hydraulic system of claim 1, further comprising a load sense circuit configured to hydraulically couple a load sense relief valve, a hydraulic control of the hydraulic pump, a control port of the first pressure compensated hydraulic valve, and a control port of the second pressure compensated hydraulic valve, the load sense circuit configured to sense the highest function load of hydraulic functions receiving flow from the hydraulic pump.

9. The pressure compensated load sense hydraulic system of claim 8, wherein the first pressure compensated hydraulic valve comprises a first spool valve configured to control flow between the hydraulic pump and the first hydraulic function, and a first pressure compensator configured to restrict flow between the hydraulic pump and the first hydraulic function based on the highest function load; and wherein the second pressure compensated hydraulic valve comprises a second spool valve configured to control flow between the hydraulic pump and the second hydraulic function, and a second pressure compensator configured to restrict flow between the hydraulic pump and the second hydraulic function based on the highest function load.

10. The pressure compensated load sense hydraulic system of claim 9, wherein the first pressure compensator restricts flow between the hydraulic pump and the first hydraulic function based on a pressure balance between the highest function load sensed by the load sense circuit and the first function load; and the second pressure compensator restricts flow between the hydraulic pump and the second hydraulic function based on a pressure balance between the highest function load sensed by the load sense circuit and the second function load.

11. A pressure compensated load sense hydraulic method for a machine comprising a first hydraulic function, a second hydraulic function, and a hydraulic pump that provides flow to the first and second hydraulic functions, the method comprising:

controlling flow between the hydraulic pump and the first hydraulic function using a first pressure compensated hydraulic valve based on a highest function load where the first hydraulic function has a first function load and the second hydraulic function has a second function load, the highest function load being the greater of the first and second function loads;

controlling flow between the hydraulic pump and the second hydraulic function using a second pressure compensated hydraulic valve based on the highest function load;

monitoring first control signals that activate the first hydraulic function;

monitoring second control signals that activate the second hydraulic function;

determining when the first hydraulic function is stalled;

while the first hydraulic function is stalled, closing the first hydraulic valve to prevent flow to or from the first hydraulic function and block the first function load from the pump when the second hydraulic function is activated, and reopening the first hydraulic valve to allow flow to or from the first hydraulic function and unblock the first function load from the pump when the second hydraulic function is deactivated.

12. The pressure compensated load sense hydraulic method of claim 11, wherein determining when the first hydraulic function is stalled comprises:

resetting an initialization timer each time the first control signals start or stop activating the first hydraulic function;

running the initialization timer while the first control signals continue activating the first hydraulic function; and determining the first hydraulic function is stalled when the initialization timer exceeds an initialization period.

13. The pressure compensated load sense hydraulic method of claim 12, wherein the first function initialization period is 10 seconds.

14. The pressure compensated load sense hydraulic method of claim 12, wherein the step of closing the first hydraulic valve while the first hydraulic function is stalled and the second hydraulic function is activated comprises:

closing the first hydraulic valve for a shutoff period to prevent flow to or from the first hydraulic function;

opening the first hydraulic valve for a refresh period to allow flow to or from the first hydraulic function; and repeating the closing the first hydraulic valve for a shutoff period and opening the first hydraulic valve for a refresh period steps while the first hydraulic function is stalled and the second hydraulic function is activated.

15. The pressure compensated load sense hydraulic method of claim 14, wherein the machine is a skidder, the first hydraulic function is a hydraulic grapple, and the second hydraulic function is a hydraulic boom or a hydraulic arch.

16. The pressure compensated load sense hydraulic method of claim 11, wherein the step of closing the first hydraulic valve while the first hydraulic function is stalled and the second hydraulic function is activated comprises:

closing the first hydraulic valve for a shutoff period to prevent flow to or from the first hydraulic function;

opening the first hydraulic valve for a refresh period to allow flow to or from the first hydraulic function; and repeating the closing the first hydraulic valve for a shutoff period and opening the first hydraulic valve for a refresh period steps while the first hydraulic function is stalled and the second hydraulic function is activated.

17. The pressure compensated load sense hydraulic method of claim 16, wherein the shutoff period is 5 seconds, and the refresh period is 1 second.

18. The pressure compensated load sense hydraulic method of claim 11, further comprising:

sensing the highest function load of hydraulic functions receiving flow from the hydraulic pump using a load sense circuit hydraulically coupling a load sense relief valve, a hydraulic control of the hydraulic pump, a control port of the first pressure compensated hydraulic valve, and a control port of the second pressure compensated hydraulic valve.

19. The pressure compensated load sense hydraulic method of claim 18, wherein the first pressure compensated hydraulic valve comprises a first spool valve and a first pressure compensator, and the second pressure compensated hydraulic valve comprises a second spool valve and a second pressure compensator;

wherein controlling flow between the hydraulic pump and the first hydraulic function comprises controlling flow between the hydraulic pump and the first hydraulic function using the first spool valve, and restricting flow between the hydraulic pump and the first hydraulic function based on the highest function load using the first pressure compensator; and wherein controlling flow between the hydraulic pump and the second hydraulic function comprises controlling flow between the hydraulic pump and the second hydraulic function using the second spool valve, and restricting flow between the hydraulic pump and the second hydraulic function based on the highest function load using the second pressure compensator.

20. The pressure compensated load sense hydraulic method of claim 19, wherein restricting flow between the hydraulic pump and the first hydraulic function comprises pressure balancing by the first pressure compensator between the highest function load sensed by the load sense circuit and the first function load; and wherein restricting flow between the hydraulic pump and the second hydraulic function comprises pressure balancing by the second pressure compensator between the highest function load sensed by the load sense circuit and the second function load.

* * * * *